March 21, 1950 F. J. WILLIAMS 2,501,558
COUPLING MEANS FOR SEISMOMETERS
Filed March 7, 1949
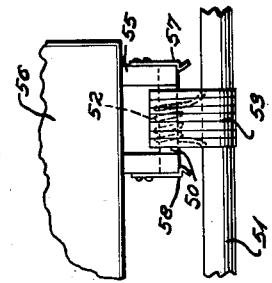
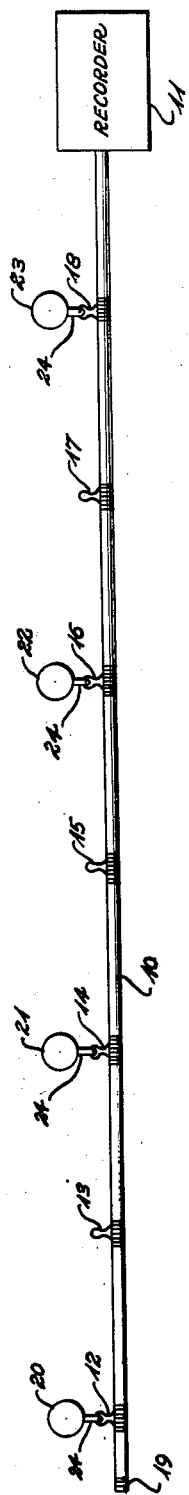
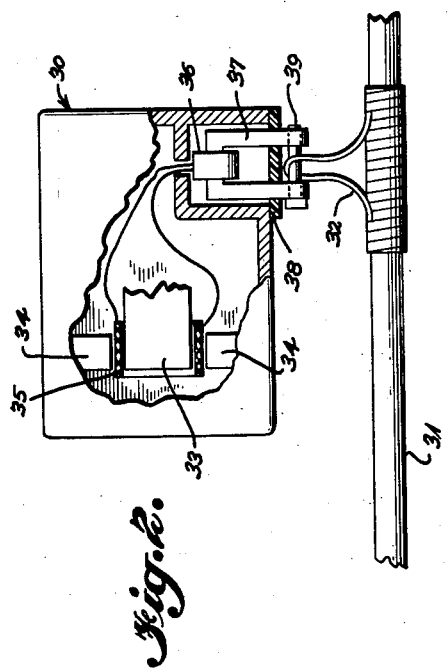
INVENTOR.
Floyd J. Williams
BY
Stevens, Davis, Miller & Mosher
ATTORNEYS Patented Mar. 21, 1950

2,501,558

UNITED STATES PATENT OFFICE 2,501,558

COUPLING MEANS FOR SEISMOMETERS

Floyd J. Williams, Dallas, Tex., assignor to Geophysical Service, Inc., Dallas, Tex., a corporation of Delaware Application March 7, 1949, Serial No. 79,968

4 Claims. (Cl. 177—352)

This invention relates to seismometers such as are used in geophysical prospecting and particularly to an arrangement for expeditiously coupling such seismometers to a signal cable through which signals from the seismometers are carried to a recording equipment.

In seismic prospecting it is common practice to detonate a charge explosive at some point on the earth's surface and to detect the seismic waves created as a result of that explosion at a series of points spaced from the point of explosion, usually in a straight line therefrom. For this purpose a series of instruments known as seismometers are used and are distributed along a line where it is desired to detect the seismic waves.

Since it is usually desirable to record the signals generated by all of the seismometers on a single record, it is customary to connect each of the seismometers to the recording equipment by a pair of electrical conductors. Since the seismometers are generally placed in a line, it is convenient to combine all of these conductors in a single cable, known as a seismometer cable, and to lay this cable from the recording point along a line that extends past each of the seismometers. Each of the seismometers is then connected to the appropriate conductors in the cable at the point where the cable passes the seismometer.

It is not feasible to connect the seismometers permanently to the seismometer cable at fixed intervals because, depending upon the terrain and the type of information desired, the spacing between the seismometers may not always be the same. Furthermore, since seismometers are often used in rough or swampy territory, it would be a difficult matter to transport and place the seismometers and the cable all at the same time. It is highly preferable, therefore, that the seismometers be completely separate from the cable and be connected to the cable after they have been placed in position. To do this, however, necessitates repeated splicing or connecting to the seismometer cable in the field.

It is the purpose of this invention to avoid the making of repeated electrical connections or splices to seismometer cables in the field and still permit the placing of the seismometers, the placing of the seismometer cable, and the subsequent connection of the seismometer cable to the seismometers without the necessity of making electrical connections or splices.

Briefly, the present invention comprises providing each seismometer with a magnetic coupling unit that can be used to couple that seismometer to the seismograph cable without the necessity of making electrical connections or splices. It also comprises the provision of coupling means spaced along the seismometer cable and capable of cooperating with the magnetic coupling means on the seismometers to induce current flows in the appropriate conductors of the seismometer cable in accordance with the signals from the various seismometers.

Further details and advantages of this invention will be apparent from the following detailed description of one embodiment thereof and by reference to the appended drawings to which that description refers.

In the drawings:

Figure 1 is a schematic illustration of a series of seismometers connected to a cable in accordance with this invention.

Figure 2 is a schematic illustration on a larger scale of a single seismometer connected to a seismometer cable in accordance with the principles of this invention. Parts of the seismometer are cut away or omitted to simplify the showing. The seismometer is shown as turned on its side to better illustrate the invention.

Figure 3 is a schematic illustration of a modification of the construction illustrated in Figure 2.

As illustrated in Figure 1, a multi-conductor seismometer cable 10 is connected to a recorder 11 in the usual manner. At fixed intervals along the length of this seismometer cable 10, conductor loops 12, 13, 14, 15, 16, 17 and 18 are provided. Each of these loops is permanently spliced to a pair of conductors in the cable and the splice is covered and taped to protect it and the cable from deterioration by the effects of the elements. The end of the seismometer cable 19 which is remote from the recorder is also appropriately taped and covered so that it will be adequately protected.

The seismometer cable 10 has been shown as having seven connecting loops 12 and 18, inclusive, but it will be understood that it can have as many of these connecting loops as is desired. Each of the connecting loops may be connected to a different pair of conductors, or several of the loops may be connected to the same pair of conductors, if desired. Quite often it will be desirable to connect several loops that lie adjacent each other to the same pair of conductors for this will permit the use of several seismometers at adjacent locations and the combining of their signals in the same pair of conductors, or will permit the use of one seismometer at any one of the several locations thus providing for flexibility in the location of the seismometers.

As illustrated in Figure 1, there are four seismometers 20, 21, 22 and 23 placed respectively at the locations of the four connecting loops 12, 14, 16 and 18. Additional seismometers could be placed at the positions of the connecting loops 13, 15 and 17 or the positions of the seismometers illustrated could be shifted relative to loops illustrated.

Extending from each of these seismometers is a magnetic coupler 24 adapted to be removably coupled to a conductor loop. With this arrangement, the seismometers can be placed in position, the cable extended along side of the seismometers and the coupling then established.

The details of this magnetic coupler are illustrated in Figure 2 which shows a seismometer 30, on its side, with certain parts cut away or omitted for clarity, and a seismometer cable 31 having a connecting loop 32 opposite the seismometer. The case of the seismometer 30 has been cut away to show magnetic pole pieces 33 and 34 which cooperate with a relatively moving coil 35 to induce in the coil electrical signals indicative of seismic vibrations. The moving coil 35 is connected to a transformer coil 36 mounted on a transformer core 37 which core extends through a sealing plate 38 to a point outside of the case of the seismometer. There it is completed by a link 39 in the form of a removable pin extending through holes in the outwardly extending ends of the transformer core proper.

Coupling to the seismometer cable is accomplished by simply removing the pin 39 and reinserting it and at the same time passing it through the loop 32 on the seismometer cable 31 so as to fasten the seismometer cable to the seismometer with the loop extending around the extending portion of the transformer core.

The loop 32, on the seismometer cable, may be formed by opening the insulation on the seismometer cable, soldering a short piece of insulating wire in the proper circuit and appropriately sealing and taping the connections or in any other appropriate manner in which a single loop can be brought out.

As illustrated in Figure 3, the magnetic link 50, may be made a permanent part of the cable 51, by wrapping a number of turns of insulated wire 52 around the magnetic link 50, connecting the ends of this wire into the appropriate conductors of the cable 51 and then taping the wound magnetic link 50 to the cable 52 with insulating tape 53.

The magnet core 55 of the seismometer 56 may then be made with open ends that are slotted to receive the ends of the link 50 and provided with spring catches 57 and 58 to hold it in place.

It will be at once apparent that, if desired, a more efficient coupling may be obtained by utilizing a coil consisting of several turns of wire instead of a single loop of wire attached to the seismometer cable and this coil may be wound on a hollow form that will quite accurately fit over the removable portion of the transformer core. Numerous other modifications will immediately be apparent to those skilled in the art and are considered to be within the scope of this invention and the appended claims.

What is claimed:

1. A seismometer including a transformer core at least part of which lies outside of the seismometer case, a winding on the transformer core connected to receive electrical signals from the seismometer, and a removable portion in the transformer core outside of the seismometer case and adapted to be removed and replaced to permit the insertion and removal of a secondary winding on the transformer core.

2. A seismometer as defined in claim 1 further characterized in that a transformer core lies partly inside of the case of the seismometer and the winding that receives signals from the seismometer lies inside of the case of the seismometer, and in that sealing means are pivoted for sealing the transformer core to the case of the seismometer where it passes through the case of the seismometer.

3. A seismometer system including a multiconductor seismometer cable having a series of taps spaced throughout its length, each tap comprising a conductor connected between two conductors in the seismometer cable and forming a loop outside of the seismometer cable, and a plurality of seismometers connected to a plurality of said taps magnetically, said magnetic connection comprising a transformer core having a removable section to permit the passing of the transformer core through one of said loops and a coil wound on said transformer core and connected to receive signals from the seismometer.

4. A seismometer as defined in claim 1 in which the removable portion of the transformer core has a secondary winding permanently mounted thereon.

FLOYD J. WILLIAMS.

REFERENCES CITED

The following references are of record in the file of this patent:

UNITED STATES PATENTS

| Number | Name | Date |
| --- | --- | --- |
| 2,325,199 | Woods | July 27, 1943 |
| 2,379,800 | Hare | July 3, 1945 |
| 2,476,121 | Smith | July 12, 1949 |

Certificate of Correction

Patent No. 2,501,558                                         March 21, 1950

FLOYD J. WILLIAMS

It is hereby certified that errors appear in the printed specification of the above numbered patent requiring correction as follows:

Column 3, lines 43 and 44, for the word "insulating" read *insulated*; column 4, line 27, for "pivoted" read *provided*;

and that the said Letters Patent should be read with these corrections therein that the same may conform to the record of the case in the Patent Office.

Signed and sealed this 20th day of June, A. D. 1950.

[SEAL]

THOMAS F. MURPHY,
*Assistant Commissioner of Patents.*